United States Patent
Noda et al.

(10) Patent No.: US 9,209,970 B2
(45) Date of Patent: Dec. 8, 2015

(54) METHOD OF GENERATING KEY

(75) Inventors: Jun Noda, Tokyo (JP); Hiroyuki Seki, Nara (JP); Yoshitaka Nakamura, Nara (JP)

(73) Assignees: NEC CORPORATION, Tokyo (JP); NATIONAL UNIVERSITY CORPORATION NARA INSTITUTE OF SCIENCE AND TECHNOLOGY, Ikoma-shi (JP)

(*) Notice: Subject to any disclaimer, the term of this patent is extended or adjusted under 35 U.S.C. 154(b) by 100 days.

(21) Appl. No.: 13/976,573

(22) PCT Filed: Dec. 27, 2011

(86) PCT No.: PCT/JP2011/080583
§ 371 (c)(1),
(2), (4) Date: Jun. 27, 2013

(87) PCT Pub. No.: WO2012/091164
PCT Pub. Date: Jul. 5, 2012

(65) Prior Publication Data
US 2013/0272520 A1    Oct. 17, 2013

(30) Foreign Application Priority Data

Dec. 28, 2010    (JP) ................................ 2010-293094

(51) Int. Cl.
*H04L 9/00* (2006.01)
*H04L 9/08* (2006.01)
*H04M 1/725* (2006.01)

(52) U.S. Cl.
CPC ........... *H04L 9/0861* (2013.01); *H04M 1/7253* (2013.01); *H04M 2250/12* (2013.01); *H04M 2250/64* (2013.01)

(58) Field of Classification Search
None
See application file for complete search history.

(56) References Cited

U.S. PATENT DOCUMENTS 7,907,901 B1 * 3/2011 Kahn et al. ................... 455/41.2
8,421,595 B2    4/2013 Cassone
(Continued)

FOREIGN PATENT DOCUMENTS

CN        1961327 A    5/2007
CN      101101687 A    1/2008
(Continued)

OTHER PUBLICATIONS

SDK for FeliCa products, Nov. 18, 2009 (http://www.sony.co.jp/Products/felica/pdt/data/SDK_Products.pdf) 32 pgs.
(Continued)

Primary Examiner — Ghazal Shehni
(74) Attorney, Agent, or Firm — Sughrue Mion, PLLC

(57) ABSTRACT

According to a method of generating a key of the present invention, a first device and a second device are first brought into contact with one vibrator. In this state, the vibrator generates vibration. A first acceleration sensor provided in the first device and a second acceleration sensor provided in the second device detect the vibration. Subsequently, the first device notifies the second device of a first feature value based upon the detection result of the first acceleration sensor. The second device notifies the first device of a second feature value based upon the detection result of the second acceleration sensor. Then the first device compares the notified second feature value with the first feature value and generates a key based upon the comparison result. The second device compares the notified first feature value with the second feature value and generates a key based upon the comparison result.

30 Claims, 12 Drawing Sheets

(56) References Cited

U.S. PATENT DOCUMENTS

| | | |
|---|---|---|
| 2008/0019514 A1 | 1/2008 | Stromberg et al. |
| 2008/0159529 A1 | 7/2008 | Aarts et al. |
| 2009/0046859 A1 | 2/2009 | Bichler et al. |
| 2010/0049659 A1 | 2/2010 | Cassone |
| 2010/0199092 A1 | 8/2010 | Andrus et al. |
| 2011/0010551 A1 | 1/2011 | Razzell |

FOREIGN PATENT DOCUMENTS

| | | |
|---|---|---|
| JP | 2001-36638 A | 2/2001 |
| JP | 2008-311726 A | 12/2008 |
| JP | 2009063563 A | 3/2009 |
| JP | 2010-187282 A | 8/2010 |
| JP | 2011101118 A | 5/2011 |
| JP | 2011130224 A | 6/2011 |
| WO | 2008/075638 A1 | 6/2008 |
| WO | 2009014063 A1 | 1/2009 |
| WO | 2009/109930 A2 | 9/2009 |

OTHER PUBLICATIONS

Jonathan Lester et al., "'Are You With Me?'—Using Accelerometers to Determine if Two Devices are Carried by the Same Person", Pervasive 2004, LNCS 3001, pp. 33-50.

Tam Huynh et al., "Analyzing Features for Activity Recognition", sOc-EUSAI 2005, pp. 159-163.

Daniel Bichler et al., "Key Generation Based on Acceleration Data of Shaking Process", UbiComp 2007, LNCS 4717, pp. 304-417.

Rene Mayrhofer et al., "Shake Well Before Use: Authentication Based on Accelerometer Data", Pervasive 2007, JNCS 4480, pp. 144-161.

International Search Report for PCT/JP2011/080583 dated Jan. 31, 2012.

Communication dated Feb. 15, 2015 from the State Intellectual Property Office of the People's Republic of China in counterpart application No. 201180063270.1.

Office Action dated Oct. 7, 2015 in JP Application No. 2012-551065.

* cited by examiner

METHOD OF GENERATING KEY

CROSS REFERENCE TO RELATED APPLICATIONS

This application is a National Stage of International Application No. PCT/JP2011/080583 filed Dec. 27, 2011, claiming priority based on Japanese Patent Application No. 2010-293094 filed Dec. 28, 2010, the contents of all of which are incorporated herein by reference in their entirety.

TECHNICAL FIELD

The present invention relates to generation of a key for controlling steps of a cryptographic algorithm.

BACKGROUND ART

Secure and usable mutual authentication systems have been demanded in order to perform ad hoc data transmission between devices having a wireless interface. The following examples have been known as technology relating to such mutual authentication systems.

For example, some techniques using PIN (Personal Identification Number) have been known for mutual authentication between devices having a wireless interface. Those techniques are hereinafter referred to as "Related Art 1."

As in Patent Literature 1, there have also been known techniques of detecting whether a button provided in a device is pushed, generating a unique group connection ID, and using the unique group connection ID as a common key (authentication key) for mutual authentication. Those techniques are hereinafter referred to as "Related Art 2."

In Non-Patent Literature 1, devices each having a non-contact IC reader are held up over each other to exchange keys. The devices mutually use those keys as authentication keys. Those techniques are hereinafter referred to as "Related Art 3."

Patent Literature 2 and Non-Patent Literatures 2 to 6 disclose means using an acceleration sensor, which is more advantageous in implementation cost than a non-contact IC reader. In those references, the same motion is supplied to two devices having an acceleration sensor from an external source (for example, those devices are vigorously shaken). Thus, a common variation is shared with those devices. Based upon such a common variation, an authentication key is shared with those devices. Those techniques are hereinafter referred to as "Related Art 4."

In Related Art 1, data with a large number of digits should be inputted without any error in order to obtain high cipher strength by a sufficient key length. Such a process is troublesome and difficult. Therefore, there has been a problem in usability.

In Related Art 2, to push a button is a process that can readily be performed by anyone. When a button is accidentally or intentionally pushed by a third party, an authentication key is needlessly provided to the third party. Thus, there has been a problem in security.

In Related Art 3, a non-contact IC reader should be mounted on each of devices that are to be subjected to mutual authentication. Thus, there has been a problem in cost for those devices.

In Related Art 4, a user should aggregately hold two devices and vigorously shake those devices. Such an operation may be difficult in itself.

Furthermore, in Related Art 4, since two devices are aggregately held, many restrictions are imposed on the size, shape, weight of the devices, and the like. In order to apply this technology to a device, the device should have a size and a shape that allow two devices to be held aggregately. Thus, it is difficult or even impossible to apply this technology if one of two devices is a fixed device or if any one of two devices has a shape, size, or weight that makes it difficult to hold those two devices aggregately.

Moreover, in Related Art 4, since two devices are aggregately held and shaken, each of the devices should have a resistance to such vibration. Generally, a user of a device is not specified in a design phase. Supposing that an unspecified user vibrates a device, the device should be designed with some margins of the vibration resistance in consideration of individual differences in amplitude or speed of vibration to be applied. In this regard, there is also a restriction on design of the device.

PRIOR ART LITERATURE

Patent Literature

Patent Literature 1: JP-A 2001-36638
Patent Literature 2: JP-A 2008-311726

Non-Patent Literature

Non-Patent Literature 1: SDK for FeliCa Products, the Internet (http://www.sony.co.jp/Products/felica/pdt/data/SDK_Products.pdf).

Non-Patent Literature 2: J. Lester, B. Hannaford, and G. Borriello, "Are You With Me?"—Using accelerometers to determine if two devices are carried by the same person, Pervasive 2004, LNCS 3001, pp. 33-50, 2004.

Non-Patent Literature 3: Y. Huynh and B. Schiele, Analyzing features for activity recognition, sOc-EUSAI '05, pp. 159-163, 2005.

Non-Patent Literature 4: D. Bichler, G. Stromberg, M. Huemer, and M. Low, Key generation based on acceleration data of shaking processes, UbiComp 2007, LNCS 4717, pp. 304-417, 2007.

Non-Patent Literature 5: R. Mayrhofer and H. Gellersen, Shake well before use: Authentication based on accelerometer data, Pervasive 2007, LNCS 4480, pp. 144-161, 2007.

Non-Patent Literature 6: Takahiro Minami, Yuichi Nino, Jun Noda, Yoshitaka Nakamura, and Hiroyuki Seki, Key Generation from Human Movements for Secure Device Pairing, the Internet (http://www-higashi.ist.osaka-u.ac.jp/~y-nakamr/research/csec/44csec.pdf).

SUMMARY OF INVENTION

Problem(s) to be Solved by Invention

It is an object of the present invention to provide key generation technology that does not require a user's difficult operation such as aggregately holding and shaking two devices and that has loose restrictions on the shape, size, weight of devices, and the like, and to provide mutual authentication technology based upon this key generate technology.

Means for Solving Problem(s)

According to the present invention, a method of generating a key includes a vibration detection step in which a vibrator generates vibration in a state in which a first device and a second device are brought into contact with the vibrator and a first acceleration sensor provided in the first device and a second acceleration sensor provided in the second device detect the vibration, a transmission step in which the first device transmits a first feature value based upon the detection result of the first acceleration sensor to the second device, a reception step in which the first device receives a second feature value based upon the detection result of the second acceleration sensor from the second device, and a key generation step in which the first device compares the received second feature value with the first feature value and generates a key based upon the comparison result.

Furthermore, according to the present invention, a computer-readable storage medium stores a program executable in an apparatus having an acceleration sensor, data communication means, and a processor. The program executes, with the processor, a procedure including a detection step of detecting, with the acceleration sensor, an acceleration of the apparatus that is produced in accordance with vibration generated by a vibrator when the apparatus and another apparatus are brought into contact with the vibrator, a transmission step of transmitting, with the data communication means, a first feature value based upon the detection result of the acceleration sensor to the other apparatus, a reception step of receiving, with the data communication means, a second feature value based upon an acceleration generated in the other apparatus in accordance with vibration generated by the vibrator from the other apparatus, and a key generation step of comparing the second feature value received by the reception step with the first feature value and generating a key based upon the comparison result.

Advantageous Effects of Invention

According to the present invention, a first device and a second device are brought into contact with the same vibrator, and the vibrator is vibrated. Thus, the first and second devices are supplied with vibration from the same vibration source. A key is generated based upon this vibration. Therefore, a user's operation such as aggregately holding and shaking the first and second devices is not required. Furthermore, the first and second devices do not need to be aggregately held in order to generate a key. Mere contact of those devices with the vibrator suffices. Accordingly, design restrictions on the size, outside shape, weight of the devices, and the like are remarkably loosened. Thus, one of the devices may be of a fixed type. Moreover, the amplitude, speed of the vibration applied to those devices, and the like can be grasped in advance from the specification of the vibrator. Therefore, it is not necessary to consider individual differences of the amplitude or speed of vibration by unspecified users. In this regard, design restrictions can also be loosened.

MODE(S) FOR CARRYING OUT INVENTION

A key generation system 100 according to an exemplary embodiment of the present invention will be described below.

Figure 1:
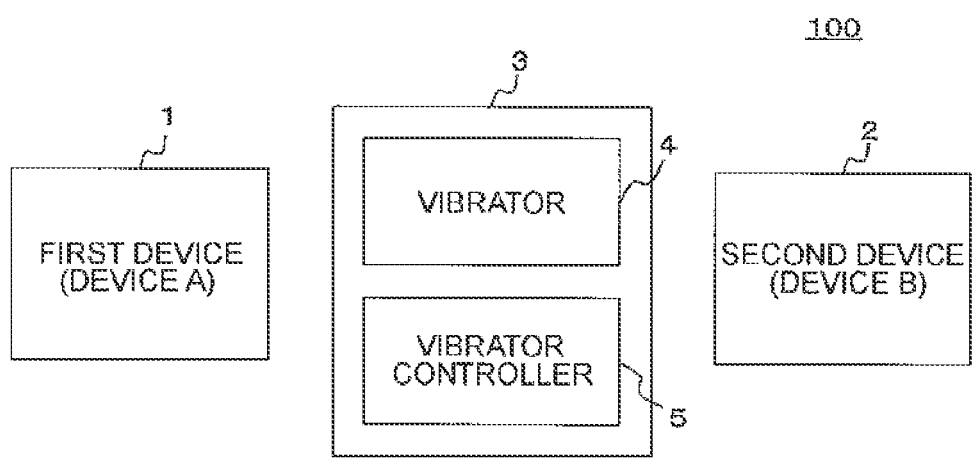
FIG. 1 is a block diagram showing a key generation system according to an exemplary embodiment of the present invention.

(1) As shown in FIG. 1, the key generation system 100 comprises a first device 1, a second device 2, and a vibration device 3. The vibration device 3 may be included in either the first device 1 or the second device 2. Hereinafter, the first device 1 and the second device 2 are referred to as "Device A" and "Device B," respectively.

Figure 2:
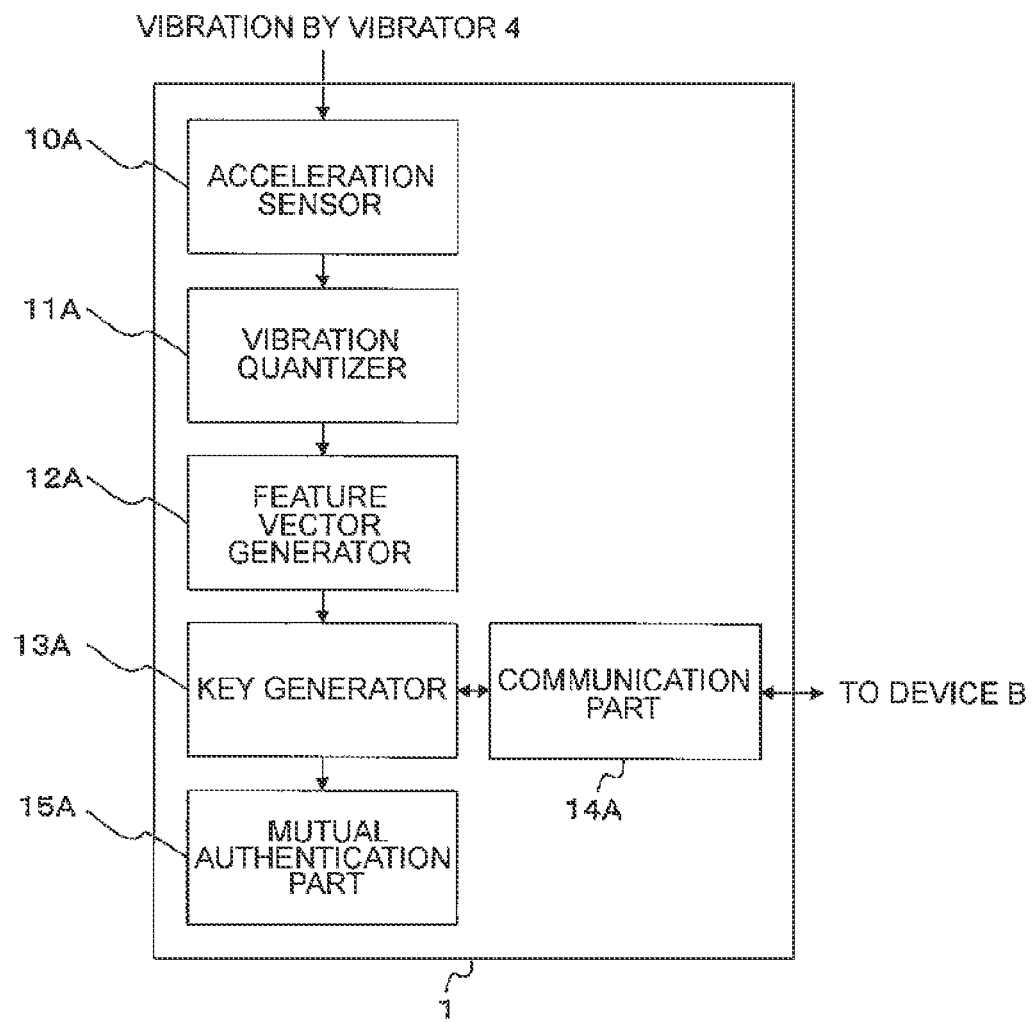
FIG. 2 is a block diagram showing a first device used in the key generation system illustrated in FIG. 1.

FIG. 2 is a block diagram showing a configuration of the first device (Device A) 1.

For example, each of the first device (Device A) 1 and the second device (Device B) 2 is a device having an acceleration sensor, a key generator, and a communication part as illustrated in FIG. 2. More specifically, each of the first device (Device A) 1 and the second device (Device B) 2 is a cellular phone terminal, a PDA (Personal Data Assistant), a notebook computer, or the like.

As shown in FIG. 2, the first device (Device A) 1 comprises a first acceleration sensor 10A, a first vibration quantizer 11A, a first feature vector generator 12A, a first key generator 13A, a first communication part 14A, and a first mutual authentication part 15A.

Figure 3:
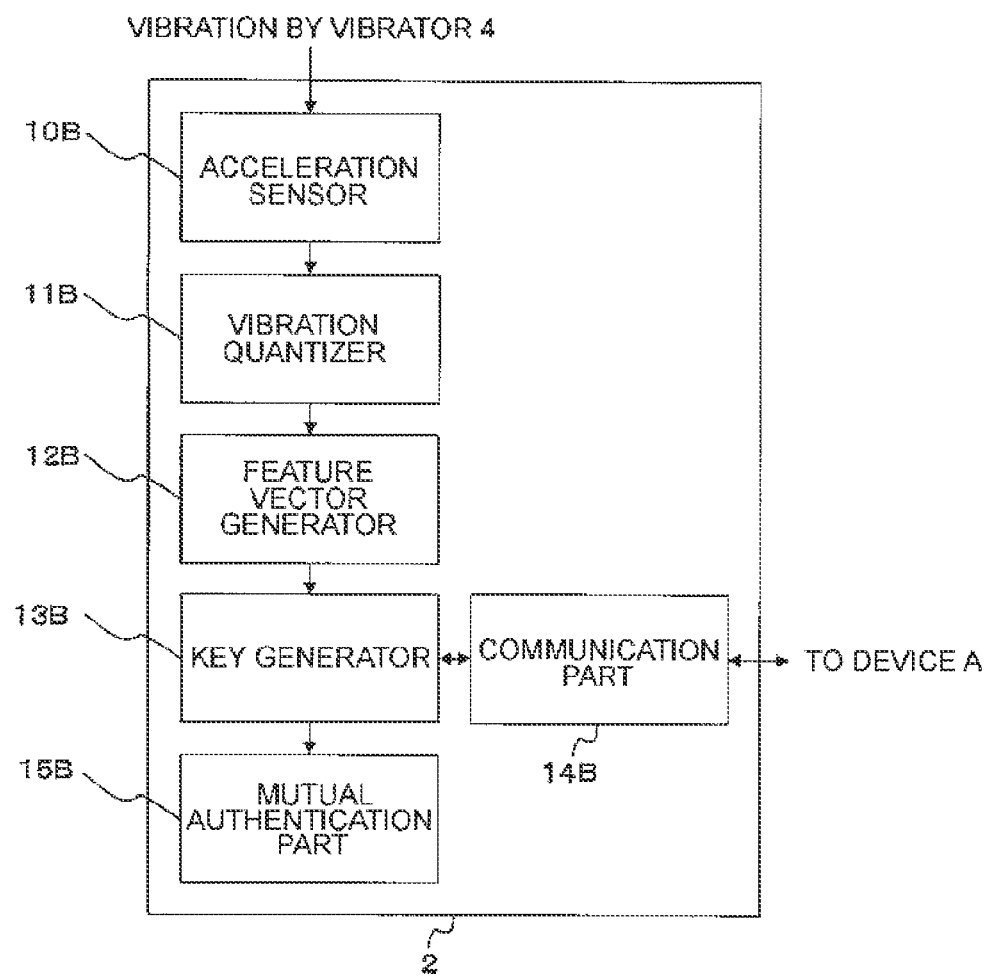
FIG. 3 is a block diagram showing a second device used in the key generation system illustrated in FIG. 1.

Although FIG. 2 illustrates a configuration example of the first device (Device A) 1, the second device (Device B) 2 may have the same configuration as the first device (Device A) 1. In such a case, as shown in FIG. 3, the second device (Device B) 2 comprises a second acceleration sensor 10B, a second vibration quantizer 11B, a second feature vector generator 12B, a second key generator 13B, a second communication part 14B, and a second mutual authentication part 15B.

The first and second communication parts 14A and 14B are communication interface devices that can communicate data with each other. It does not matter whether the first and second communication parts are of wireless or wire, the number and types of networks connecting the first and second communication parts, and the like. For convenience, the first and second communication parts 14A and 14B preferably comprise a wireless communication interface but may be a wire communication interface. When the first device (Device A) 1 and the second device (Device B) 2 are cellular phone terminals, the first and second communication parts 14A and 14B may be wireless communication devices operable to perform wireless communication with a base station of a mobile communication network, infrared communication devices such as IrDA (Infrared Data Association), which is provided on most of cellular phone terminals, or transceivers for short-distance wireless communication such as Bluetooth.

As shown in FIG. 1, the vibration device 3 includes a vibrator 4 and a vibrator controller 5 operable to control an operation of the vibrator 4.

Generally, a cellular phone terminal comprises a vibrator to generate vibration for informing a user of an incoming call or the like. Such a vibrator may be used as the vibrator 4 of the vibration device 3. When the first device (Device A) 1 and the second device (Device B) 2 are both a cellular phone terminal, both of the devices have a vibrator 4. In such a case, the vibrator of one of the devices serves as a vibrator used for key generation in the exemplary embodiment of the present invention.

Next, an operation for generating a key will be described.

Figure 4:
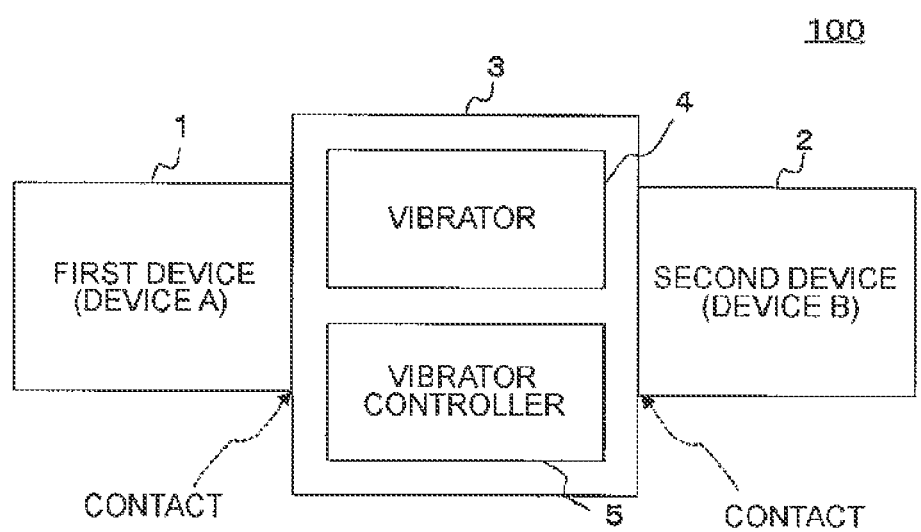
FIG. 4 is a diagram explanatory of a state of contact of the first device, the second device, and a vibration device used in the key generation system illustrated in FIG. 1 when a key is to be generated.

(2) First, as shown in FIG. 4, both of the first device (Device A) 1 and the second device (Device B) 2 are brought into contact with the vibration device 3. When the vibrator 4 is included in either one of the first device (Device A) 1 and the second device (Device B) 2, the first device (Device A) 1 and the second device (Device B) 2 are brought into direct contact with each other.

Figure 5:
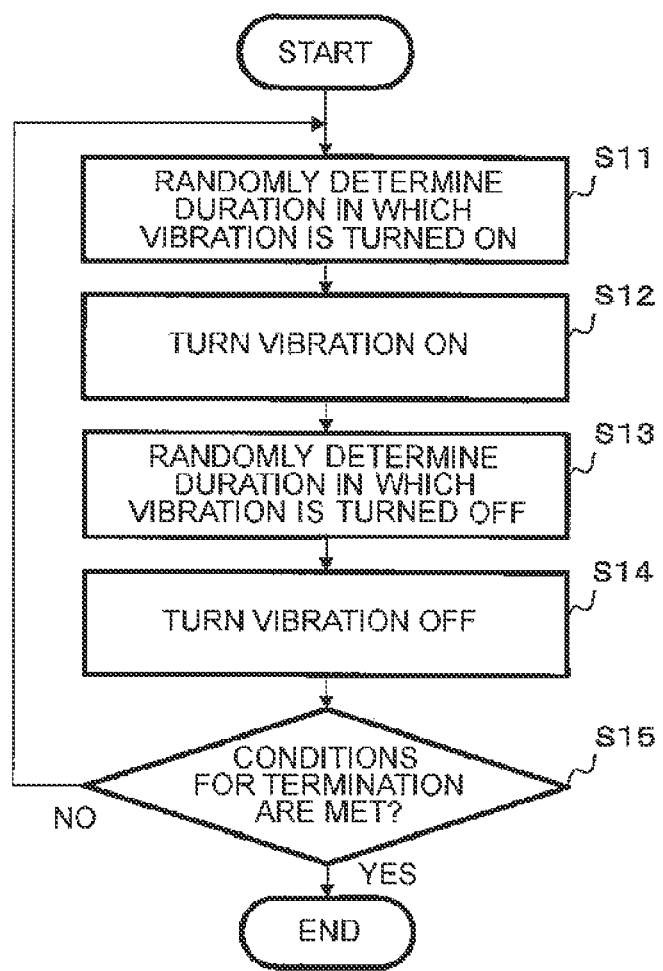
FIG. 5 is a flow chart explanatory of an operation of a vibrator controller in the vibration device used in the key generation system illustrated in FIG. 1.

(3) Then, as shown in FIG. 4, the vibrator controller 5 turns the vibrator 4 on and off in a state in which the first device (Device A) 1, the second device (Device B) 2, and the vibration device 3 are held in contact with each other. FIG. 5 shows an example of a control operation of the vibrator controller 5 at that time. The control operation of the vibrator controller 5 illustrated in FIG. 5 will be described in detail later. An example of vibration methods of the vibrator may include varying amplitudes in a stepped manner, particularly binary vibration of vibrating between a predetermined amplitude and zero. Another example may include varying amplitudes in a continuous manner.

(4) Subsequently, the first device (Device A) 1 and the second device (Device B) 2 detect vibration with the first and second acceleration sensors 10A and 10B, respectively.

Figure 6:
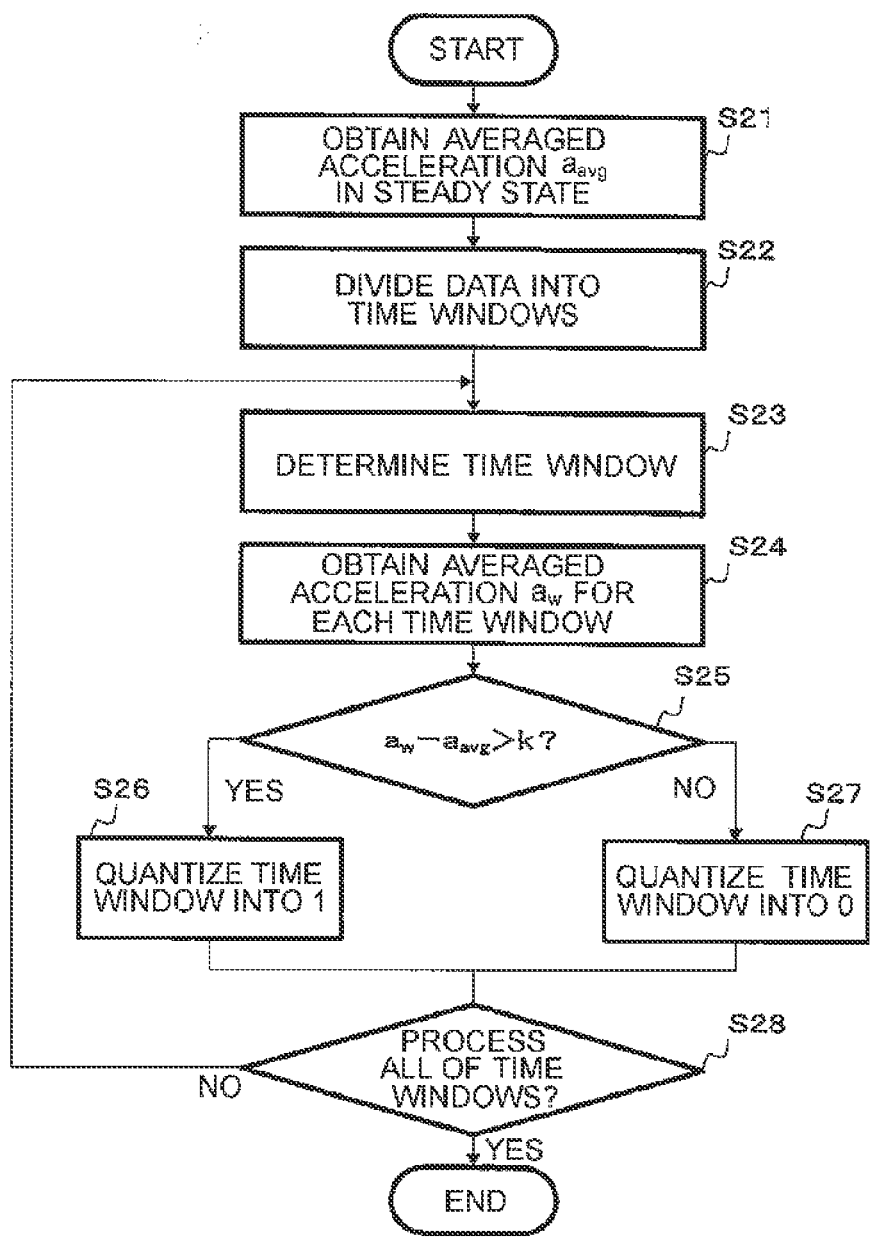
FIG. 6 is a flow chart explanatory of an example of operations of vibration quantizers in the first and second devices illustrated in FIGS. 2 and 3 to divide an output of an acceleration sensor into time windows.
Figure 7:
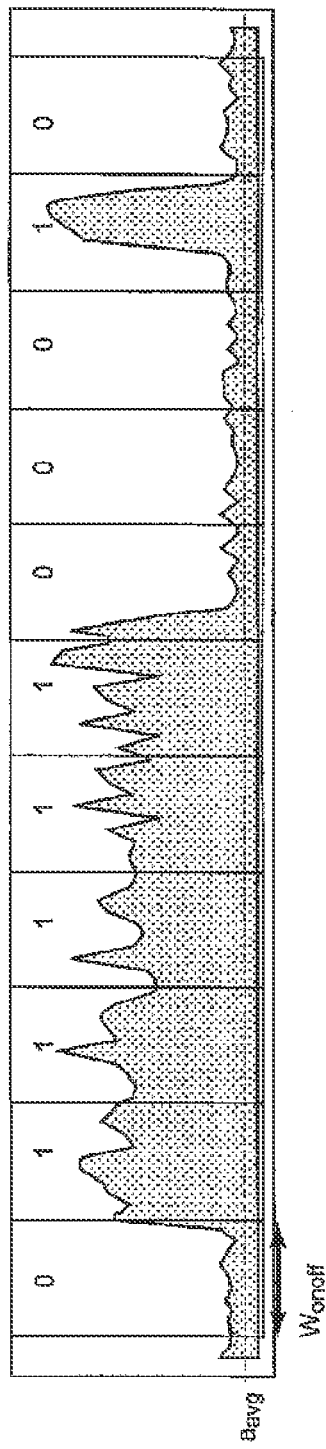
FIG. 7 is a diagram explanatory of an example of an output of an acceleration sensor that has been divided into time windows.

(5) The first and second vibration quantizers 11A and 11B respectively divide outputs of the first and second acceleration sensors 10A and 10B into time windows having a predetermined length and quantize a value of each of the divided time windows. FIG. 6 shows an example of an operation in which the first and second vibration quantizers 11A and 11B divide an output of the acceleration sensor into time windows. The operation of the vibration quantizers illustrated in FIG. 6 will be described in detail later. FIG. 7 shows an example of an output of the acceleration sensor that has been divided into time windows. Those examples assume that the vibrator 4 performs a binary operation of vibrating and not vibrating.

Depending upon states and methods of contact between the first device (Device A) 1, the second device (Device B) 2, and the vibration device 3, some differences are produced in analog values of the acceleration detected by the first and second acceleration sensors 10A and 10B. Therefore, if a key is generated based upon analog values of the acceleration, it is difficult to generate the same key having a key length sufficient for practical use on both of the first device (Device A) 1 and the second device (Device B) 2.

In contrast, as shown in FIG. 7, analog values of the acceleration are divided into time windows, and a key is generated with use of quantized outputs of the acceleration sensor. Thus, an error generated in accelerations that are to be shared with the first device (Device A) 1 and the second device (Device B) 2 is absorbed. Accordingly, an authentication key having a key length sufficient for practical use can be shared with the first device (Device A) 1 and the second device (Device B) 2.

(6) Subsequently, the first feature vector generator 12A generates a first feature vector group of $V_{fa0}$, $V_{fa1}$, $V_{fa2}$, ... based upon the output values of the first acceleration sensor 10A that have been divided into time windows and quantized. Furthermore, the first feature vector generator 12A generates candidate vector groups corresponding to the feature vectors of the first feature vector group, i.e., a candidate vector group $V_{ca01}$, $V_{ca02}$, $V_{ca03}$, ... corresponding to the first feature vector $V_{fa0}$, a candidate vector group $V_{ca11}$, $V_{ca12}$, $V_{ca13}$, ... corresponding to the second feature vector $V_{fa1}$, and a candidate vector group $V_{ca21}$, $V_{ca22}$, $V_{ca23}$, ... corresponding to the third feature vector $V_{fa2}$.

Similarly, the second feature vector generator 12B generates a second feature vector group $V_{fb0}$, $V_{fb1}$, $V_{fb2}$, ... and also generates candidate vector groups corresponding to the feature vectors of the second feature vector group, i.e., a candidate vector group $V_{cb01}$, $V_{cb02}$, $V_{cb03}$, ... corresponding to the first feature vector $V_{fb0}$, a candidate vector group $V_{cb11}$, $V_{cb12}$, $V_{cb13}$, ... corresponding to the second feature vector $V_{fb1}$, and a candidate vector group $V_{cb21}$, $V_{cb22}$, $V_{cb23}$, ... corresponding to the third feature vector $V_{fb2}$.

Hereinafter, the first feature vector group of $V_{fa0}$, $V_{fa1}$, $V_{fa2}$, ..., which are generated by the first device (Device A) 1, is collectively denoted by $V_{fai}$ where i is an integer more than 0 and is a time-series index of feature vectors. The candidate vector group corresponding to the first feature vector $V_{fa0}$ of the first feature vector group that is generated by the first device (Device A) 1 is collectively denoted by $V_{ca0j}$ where j is an integer more than 0 and is a time-series index of candidate vectors. The first candidate vector groups generated by the first device (Device A) 1 are collectively denoted by $V_{caij}$.

The feature vectors and the candidate vectors generated by the second device (Device B) 2 are defined in the same manner as described above. Specifically, the second feature vector group of $v_{fb0}$, $V_{fb1}$, $V_{fb2}$, ..., which are generated by the second device (Device B) 2, is collectively denoted by $V_{fbi}$ where i is an integer more than 0 and is a time-series index of feature vectors. The candidate vector group corresponding to the first feature vector $V_{fb0}$ of the second feature vector group that is generated by the second device (Device B) 2 is collectively denoted by $V_{cb0j}$ where j is an integer more than 0 and is a time-series index of candidate vectors. The second candidate vector groups generated by the second device (Device B) 2 are collectively denoted by $V_{cbij}$.

A feature vector is generated by combining the number of time windows in an interval continuously holding the same quantized value, i.e., a continuation interval, with the quantized value. For example, a feature vector has a structure in which a quantized value is connected to a binary notation of the number of time windows in which the quantized value continues.

Quantized values of time windows illustrated in FIG. 7 are "0," "1," "1," "1," "1," "1," "0," "0," "0," "1," and "0" from the left. There is a continuation interval in which five quantized values of "1" continue rightward from the second time window to the sixth time window. Thus, a feature vector based upon this continuation interval is "1101," which is obtained by connecting the quantized value of "1" to the number of the continuing time windows, i.e., 5, or "101" in the binary notation.

A candidate vector is generated by changing, into other values, one or both of the beginning time window and the ending time window of the continuation interval for which a feature vector has been generated and, as with a feature vector, combining the number of time windows in an interval continuously holding the same quantized value with the quantized value. A beginning time window of a continuation interval is the first time window of the continuation interval. An ending time window of a continuation interval is a time window right after the continuation interval. In a state in which one or both of quantized values of the beginning time window and the ending time window have been changed, a candidate vector is generated based upon the number of time windows in a continuation interval of time windows continuously holding the same quantized value.

The candidate vectors have three types. A first one of the candidate vectors is generated by changing a quantized value of a beginning time window of a continuation interval without changing a quantized value of an ending time window of the continuation interval. A second one of the candidate vectors is generated by changing a quantized value of an ending time window of a continuation interval without changing a quantized value of a beginning time window of the continuation interval. A third one of the candidate vectors is generated by changing quantized values of a beginning time window and an ending time window of a continuation interval. Among these three types, the third type generated by changing both of a beginning time window and an ending time window results in shifting the whole continuation interval and thus has the same value as a feature vector. Therefore, the third type does not need to be generated. In the example illustrated in FIG. 8, for the feature vector of "1101," a candidate vector of "1100" is generated by changing only a quantized value of the beginning time window, and a candidate vector of "1110" is generated by changing only a quantized value of the ending time window. Because a candidate vector of "1101" that is generated by changing both of the beginning time window and the ending time window has the same value as the feature vector, it is not generated in this example.

Candidate vectors are generated along with feature vectors in this manner for the following reason: A first vector group including the first feature vector group and the first candidate vector group generated by the first device (Device A) 1 and a second vector group including the second feature vector group and the second candidate vector group generated by the second device (Device B) 2 are compared with each other. If there is matched vectors in both of the vector groups, a key is generated based upon the matched vectors. The "matched" vectors include not only matched vectors between the first feature vector group and the second feature vector group, but also matched vectors between the first feature vector group and the second candidate vector group, matched vectors between the first candidate vector group and the second feature vector group, and matched vectors between the first candidate vector group and the second candidate vector group.

Such a comparison is made between the first vector group and the second vector group for the following reason: As described later in the operation (10), the first device (Device A) 1 and the second device (Device B) 2 generate key pieces based upon the matched feature vectors/candidate vectors and concatenate a predetermined number of key pieces to generate a key. Therefore, at least a predetermined number of matched feature vectors/candidate vectors are required to generate a key.

Meanwhile, detection timing of the acceleration may differ between the first acceleration sensor 10A and the second acceleration sensor 10B depending upon a state of contact between the first device (Device A) 1, the second device (Device B) 2, and the vibration device 3. In such a case, the beginning or ending timing of the continuation interval differs between the first device (Device A) 1 and the second device (Device B) 2. Therefore, feature vectors generated by the first device (Device A) 1 and the second device (Device B) 2 do not match with each other. If such mismatching occurs many times, it becomes difficult to generate a required number of key pieces from comparison between feature vectors.

In view of such circumstances, the beginning quantized value and the ending quantized value of a continuation interval in which feature vectors have been generated are changed. The continuation interval subjected to such changes is a sort of adjustment of the difference in assumed detection timing. Thus, candidate vectors are generated based upon the changed continuation interval and subjected to comparison between the first device (Device A) 1 and the second device (Device B) 2 in addition to the feature vectors. Accordingly, the difference of the detection timing can be absorbed to some degree. As a result, an authentication key having a key length sufficient for practical use can be shared with Devices A and B.

Furthermore, when the devices are brought into contact with each other, pulselike vibration may be generated only in one of the devices because the device is held in an unstable manner by hands, for example. Such vibration may be mixed as a noise, so that a pulselike quantized value is generated. In order to cope with such a pulselike quantized value, the first and second feature vector generators 12A and 12B may modify a value of the time window having the pulselike quantized value prior to the generation of the first and second feature vector groups and the first and second candidate vector groups. Assuming three consecutive time windows $W_{n-1}$, $W_n$, and $W_{n+1}$ where n is a natural number, the time window having a pulselike quantized value refers to a time window $W_n$ having a value that is different from $W_{n-1}$ and $W_{n+1}$ having the same value. The time window having a pulselike quantized value is $W_n=1$ where $W_{n-1}=W_{n+1}=0$, or $W_n=0$ where $W_{n-1}=W_{n+1}=1$. If time windows are sufficiently shortened, such a pulselike quantized value may be considered as an error. Such an error can be eliminated if a value of such a time window is modified so as to be equal to values of its preceding and following time windows.

Figure 8:
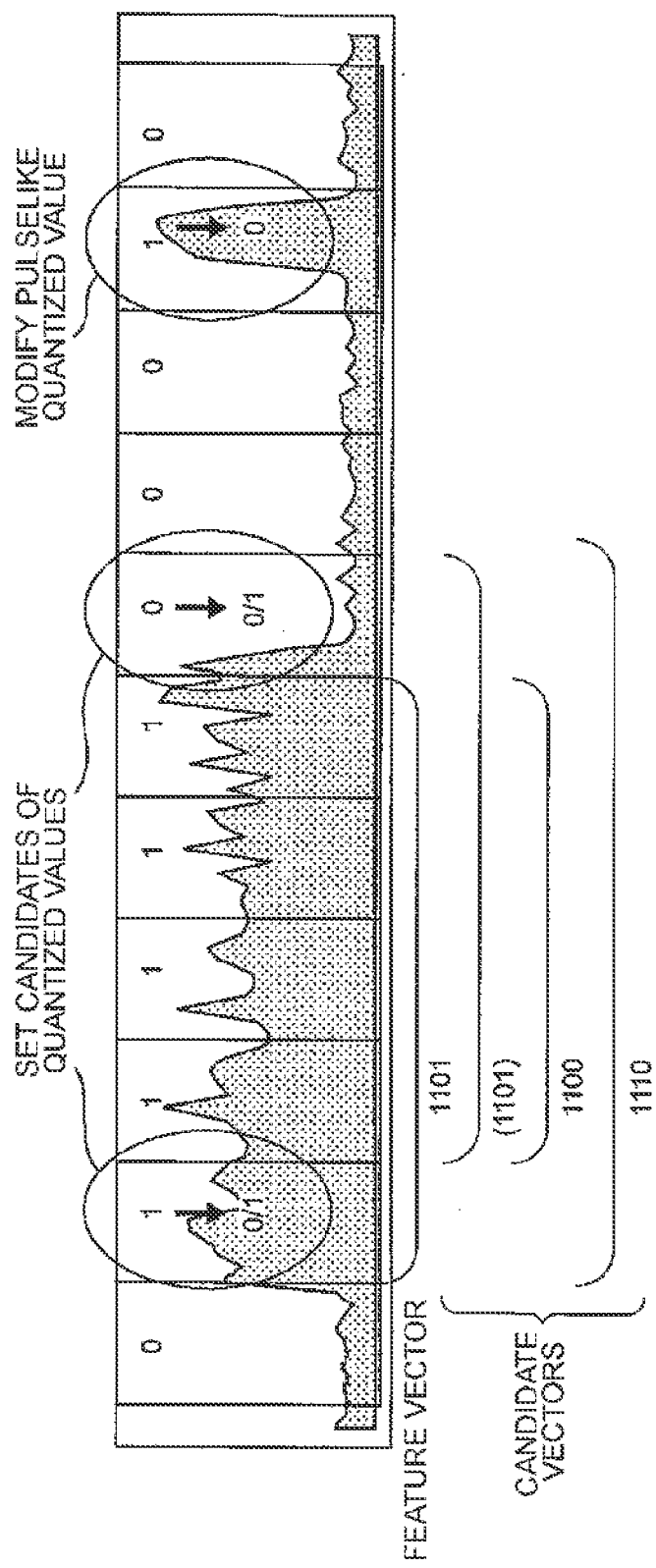
FIG. 8 is a diagram explanatory of the relationship between a feature vector and candidate vectors.
Figure 9:
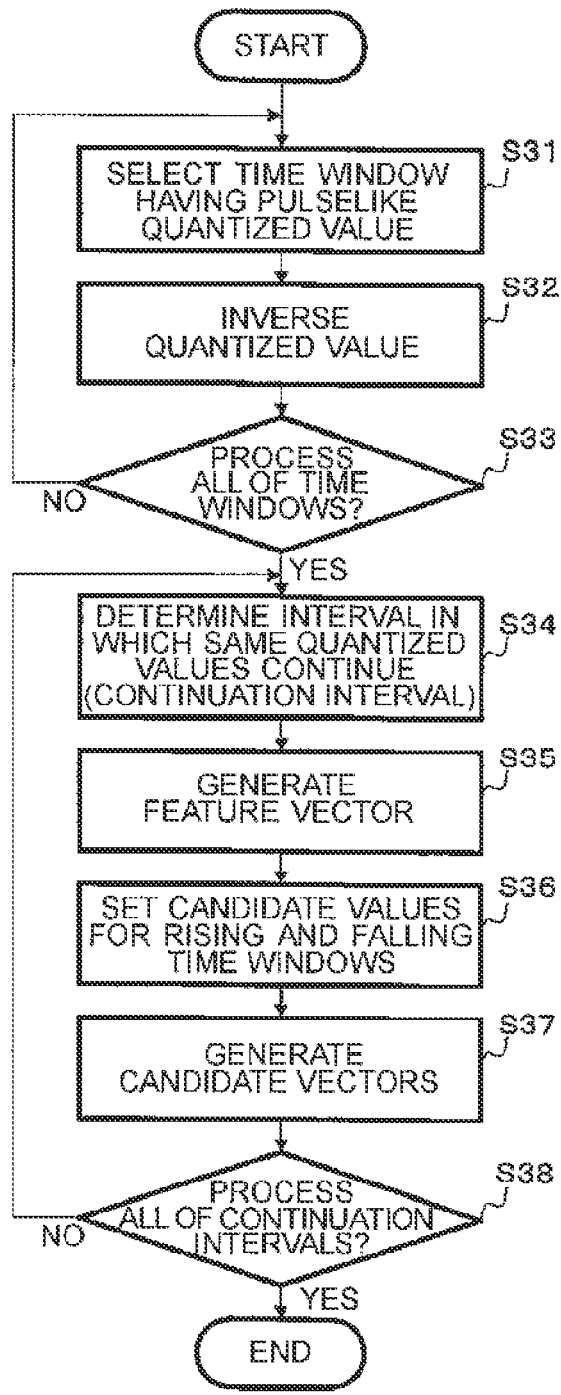
FIG. 9 is a flow chart explanatory of operations of feature vector generators in the first and second devices illustrated in FIGS. 2 and 3 when pulselike quantized values are modified to generate a feature vector and candidate vectors.

For example, the quantized value of the second time window from the right in FIG. 8 is "1," and both of quantized values of its preceding and following time windows are "0." Thus, the quantized value of the second time window is considered as a pulselike quantized value. Therefore, while the quantized value of this time window may be modified into "0," the first and second feature vector groups and the first and second candidate vector groups may be generated. FIG. 9 shows an operation of the first and second feature vector generators 12A and 12B when the first and second feature vector groups and the first and second candidate vector groups are generated while a pulselike quantized value is modified.

Figure 10:
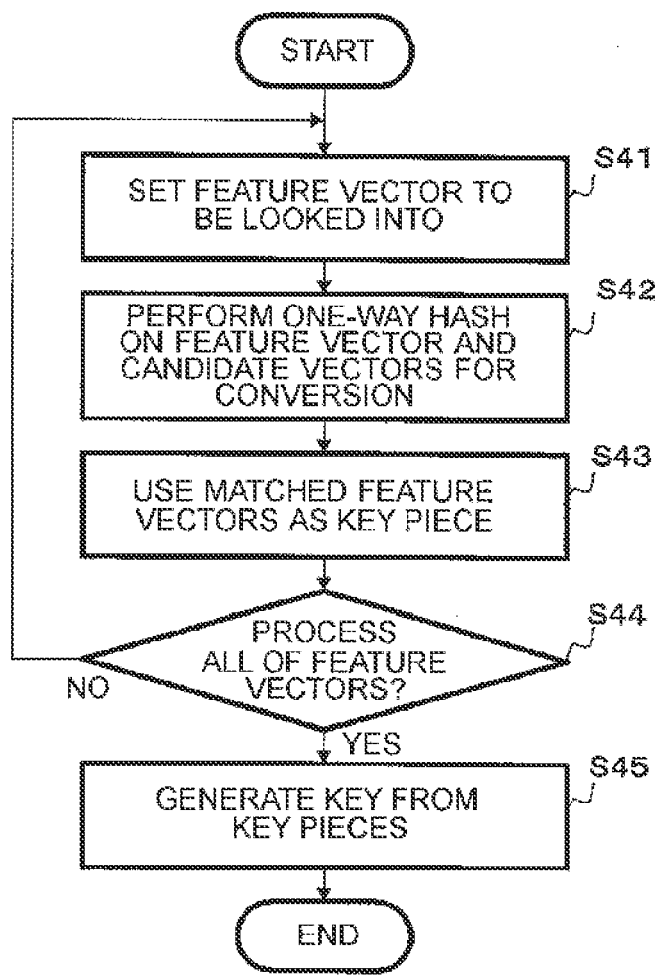
FIG. 10 is a flow chart explanatory of operations of key generators in the first and second devices illustrated in FIGS. 2 and 3 to generate a key piece from a feature vector and candidate vectors.

(7) Furthermore, as shown in FIG. 10, the first feature vector generator 12A generates all of a hash value $H(V_{fai})$ of an ith feature vector of the first feature vector group and hash values $H(V_{caij})$ of first candidate vectors corresponding to the ith feature vector. As described above, two first candidate vectors $V_{cai0}$ and $V_{cai1}$ are generated so as to correspond to the ith feature vector $V_{fai}$ of the first feature vector group. Accordingly, three first hash values $H(V_{fai})$, $H(V_{cai0})$, and $H(V_{cai1})$ are generated so as to correspond to the ith feature vector $V_{fai}$ of the first feature vector group. Similarly, the second feature vector generator 12B generates all of a hash value $H(V_{fbi})$ of the second feature vector and second hash values $H(V_{cbij})$ of second candidate vectors (Step S42). H(X) represents a value obtained by one-way hash of X, and i is an index indicative of a feature vector in question. An initial value of i is zero. The operations described in the operation (7) and the following operations (8) and (9) are performed for the same index i. Those operations (7) to (9) are repeated with increasing i by 1 until key pieces required for generating a key having a desired key length are obtained. Those skilled in the art would recognize that the generation of hash values may be omitted so that feature vectors and candidate vectors are directly be transmitted for subsequent processes, which is not preferable for security reasons.

(8) All of the second hash values $H(V_{fbi})$ and $H(V_{cbij})$ generated in the operation (7) by the second device (Device B) 2 are transmitted to the first device (Device A) 1 via the first and second communication parts 14A and 14B. Similarly, all of the first hash values $H(V_{fai})$ and $H(V_{caij})$ generated in the process (7) by the first device (Device A) 1 are transmitted to the second device (Device B) 2 (Step S42).

(9) The first key generator 13A of the first device (Device A) 1 compares a plurality of first hash values including the hash values $H(V_{fai})$ of the first feature vectors $V_{fai}$ and the hash values $H(V_{caij})$ of the corresponding first candidate vectors generated by the first feature vector generator 12A of the first device (Device A) 1, with a plurality of second hash values including the hash values $H(V_{fbi})$ of the second feature vectors $V_{fbi}$ corresponding to the first feature vector $V_{fai}$ and the hash values $H(V_{cbij})$ of the second candidate vectors, which have been received from the second device (Device B) 2 via the first communication part 14A. Thus, the first key generator 13A compares a group of first hash values corresponding to the ith one $V_{fai}$ of the first feature vectors with a group of second hash values corresponding to the ith one $V_{fbi}$ of the second feature vectors. If any of the hash values in one of the groups matches with any of the hash values in the other group, then a feature vector or a candidate vector corresponding to that hash value is used as a key piece (Step S43). If there is no hash value matched between the former group and the latter group, then no key piece is generated based upon the first feature vectors $V_{fai}$. This holds true for the second device (Device B) 2.

As described above, a plurality of candidate vectors corresponds to one feature vector. Therefore, either one of the groups of the hash values includes a hash value of one feature vector and hash values of a plurality of candidate vectors corresponding to that feature vector. For example, it is assumed that the first hash value $H(V_{fa0})$ of the first group A matches with the second hash value $H(V_{cb01})$ of the second group B when a first group A of the first hash values including the hash value $H(V_{fa0})$ of the first feature vector $V_{fa0}$ and the hash values $H(V_{ca00})$ and $H(V_{ca01})$ of the first candidate vectors corresponding to the first feature vector $V_{fa0}$ is compared with a second group B of the second hash values including the hash value $H(V_{fb0})$ of the second feature vector $V_{fb0}$ and the hash values $H(V_{cb00})$ and $H(V_{cb01})$ of the second candidate vectors corresponding to the second feature vector $V_{fb0}$. In this case, it is assumed that the first feature vector $V_{fa0}$ matches with the second candidate vector $V_{cb01}$. Thus, the first key generator 13A of the first device (Device A) 1 sets the first feature vector $V_{fa0}$ as a key piece. The same comparison is also made in the second device (Device B) 2, and the same results are obtained. Therefore, the second key generator 13B sets the second candidate vector $V_{cb01}$ as a key piece. In this example, the first feature vector of the first group A matches with the second candidate vector of the second group B. The first and second feature vectors of both of the groups may match with each other, or the first and second candidate vectors of both of the groups may match with each other.

(10) The operations (7) to (9) are performed for all of the feature vectors (Step S44). In other words, 1 is added to the current value of i, and the operations (7) to (9) are repeated.

(11) The number of key pieces obtained in the operation (10) is compared with a threshold for the number of key pieces. If the number of key pieces exceeds the threshold, the key pieces are concatenated to each other to generate a key (Step S45).

(12) The first device (Device A) 1 and the second device (Device B) 2 perform authentication using the generated key. Examples of authentication include challenge-response authentication. In the challenge-response authentication, the first device (Device A) 1 generates a random value, which is called a challenge, and sends it to the second device (Device B) 2. When the second device (Device B) 2 receives this challenge, it performs an arithmetic process by combining the key generated in the operation (11) by the second device (Device B) 2 with the challenge received from the first device (Device A) 1. As a result, the second device (Device B) 2 generates a hash value and sends it as a second response to the first device (Device A) 1. When the first device (Device A) 1 receives the response, it performs a similar arithmetic process with use of the challenge previously generated and the key generated in the operation (11) by the first device (Device A) 1 to thereby generate a first response. The first device (Device A) 1 compares the first response with the second response received from the second device (Device B) 2. If the first and second responses match with each other, the first device (Device A) 1 authenticates the second device (Device B) 2.

(13) The first device (Device A) 1 sends data encrypted with the key to the second device (Device B) 2. The second device (Device B) 2 decrypts the encrypted data with use of the key.

EXAMPLE 1

Figure 11:
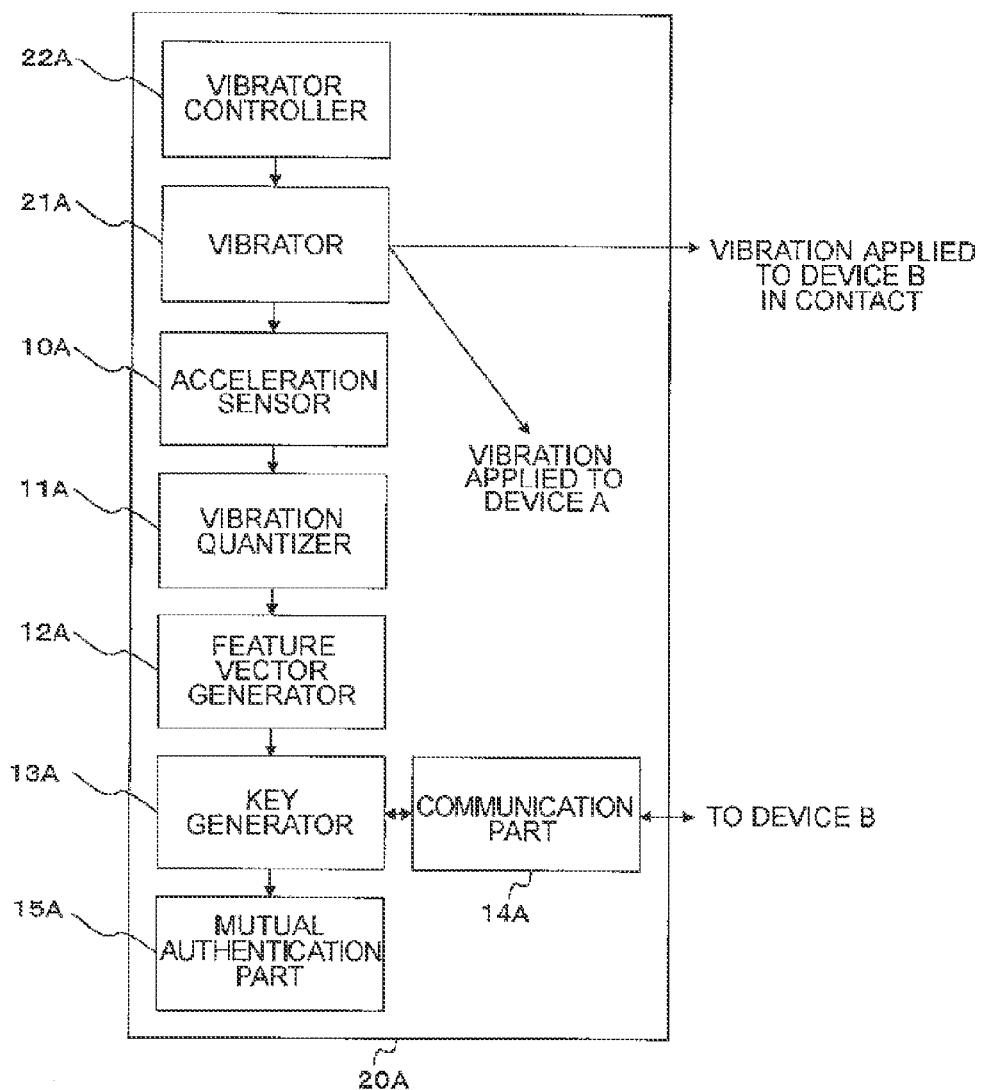
FIG. 11 is a block diagram of a first device according to an example of the present invention.

As shown in FIG. 11, a first device 20A (Device A) in this example has the same configuration as the first device 1 of the aforementioned key generation system 100 except that it includes a first vibrator 21A and a first vibrator controller 22A. The first vibrator 21A and the first vibrator controller 22A correspond to the vibrator 4 and the vibrator controller 5 of the aforementioned key generation system 100, respectively.

Figure 12:
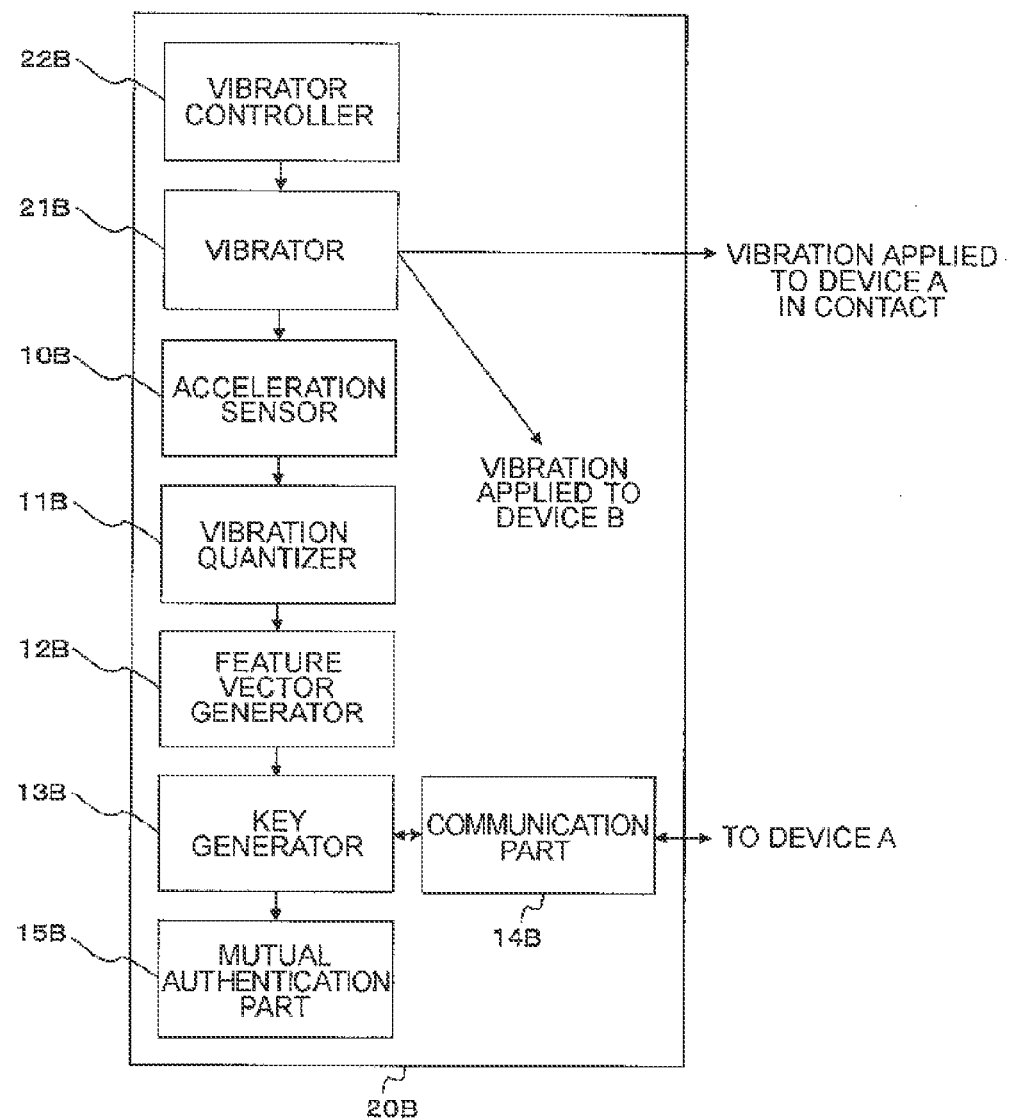
FIG. 12 is a block diagram of a second device according to an example of the present invention.

Similarly, as shown in FIG. 12, a second device 20B (Device B) in this example has the same configuration as the first device 2 of the aforementioned key generation system 100 except that it includes a second vibrator 21B and a second vibrator controller 22B. The second vibrator 21B and the second vibrator controller 22B correspond to the vibrator 4 and the vibrator controller 5 of the aforementioned key generation system 100, respectively.

As shown in FIGS. 11 and 12, the first device 20A (Device A) and the second device 20B (Device B) comprise first and second vibrators 21A and 21B and first and second acceleration sensors 10A and 10B, respectively. Furthermore, the first device 20A (Device A) and the second device 20B (Device B) comprise first and second vibrator controllers 22A and 22B, first and second vibration quantizers 11A and 11B, first and second feature vector generators 12A and 12B, first and second key generators 13A and 13B, first and second communication parts 14A and 14B, and first and second mutual authentication parts 15A and 15B. Postfixes A and B of the reference numerals are provided to distinguish between Device A and Device B. In the following description, no postfix A or B may be added if Device A and Device B do not need to be distinguished from each other.

When a device does not actively request authentication by itself, it may not necessarily have a vibrator 21 and a vibrator controller 22. Either one of Device A and Device B may have a vibrator and a vibrator controller.

Specifically, each of the devices is implemented by an information processing device such as a personal computer operating in accordance with a program. All of a plurality of supposed devices may have the same configuration. Each of FIGS. 11 and 12 illustrates only a configuration of one user terminal.

Respective portions illustrated in FIGS. 11 and 12 operate as follows.

When the devices are held in contact with each other, the vibrator controller 22 controls an operation of the vibrator 21 such that turning on and turning off are continuously repeated multiple times while it dynamically varies the length of intervals in which the vibrator is turned on (on-interval) and the length of intervals in which the vibrator is turned off (off-interval). Thus, the acceleration sensor 10 of each of the devices held in contact with each other is directed to detect vibration in the on-intervals and not to detect vibration in the off-intervals. A plurality of intervals are detected by the acceleration sensor 10. Such an operation is implemented by, for example, PWM controllability of a vibrator motor provided in a cellular phone. The vibrator controller 22 is actuated on only one of the devices that perform mutual authentication based upon an external user's operation. The number of feature vectors and corresponding candidate vectors can be increased by increasing the number of on-off repetitions, so that more key pieces can be generated. Therefore, it becomes possible to generate a key having a greater key length.

The vibration quantizer 11 obtains a magnitude a_avg of an averaged acceleration measured in a steady state of the acceleration sensor 10 beforehand. The magnitude a_avg is used to eliminate measurement errors that are different from one sensor to another. When the vibration quantizer 11 obtains time-series data of the acceleration from the acceleration sensor 10 through the operation of the vibrator controller 22, it divides the time-series data into small intervals (windows) having a size of W_onoff. At that time, a window and a subsequent window may be overlapped at a certain rate, for example, a rate of 50%. Then a magnitude a_w of an average acceleration in a window is compared with a_avg. If the difference is not less than a certain value, the window is quantized into "1." Otherwise, the window is quantized into "0." FIG. 7 shows an example of quantized values.

The feature vector generator 12 compares quantized values of a window. The feature vector generator 12 modifies a window having a different quantized value (a window that is judged as being pulselike) in comparison with quantized values of one preceding window and one following window such that the quantized value of the window in question is equal to the quantized values of the preceding and following windows. Then the feature vector generator 12 combines the number of windows in an interval continuously holding a quantized value of "1" or "0" (continuation interval), with the quantized value so as to generate a feature vector. For example, as shown in FIG. 7, when five successive windows have a quantized value of "1," a feature vector of "1101" is generated because the number of values continuously quantized into "1" is "101" (in binary). In FIG. 7, for brevity's sake, the overlap is set to be 0%. Furthermore, windows at which a quantized value changes from the quantized value of the continuation interval are provided with both candidates of "1" and "0," so that candidate vectors are generated by the same means as the aforementioned feature vector generator 12.

FIG. 8 shows an example of a feature vector and candidate vectors generated by the aforementioned process. Candidate vectors for the feature vector "1101" are "1100" and "1110." There is another candidate vector "1101," which is the same as the feature vector. That candidate vector "1101" may not be considered as a candidate vector.

For example, the key generator 13 performs one-way hash on the feature vector in time sequence and makes an exchange with another. If at least one of the candidates matches, that candidate is used as a key piece. If a ratio of the number of windows for which key pieces have been obtained to the total number of windows is equal to or higher than a predetermined threshold, then all of the resultant key pieces are concatenated to each other to generate a common key. Mutual authentication is performed based upon the common key. The mutual authentication part may use conventional well-known technology, such as challenge-response authentication.

Next, an operation of a key generation system in which the first and second devices 20A and 20B are provided as Device A and Device B, respectively will be described. In the following description, the first vibrator 21A of Device A is operated to generate a key, and the second vibrator 21B of Device B is not operated.

FIG. 5 is a flow chart showing an example of an operation of the first vibrator controller 22A in this system. First, a user brings Device A and Device B into contact with each other. At that time, in Step S11, the first vibrator controller 22A randomly determines a duration in which vibration of the first vibrator 21A is turned on. The first vibrator controller 22A turns vibration of the first vibrator 21A on for the determined duration (Step S12). Then, in Step S13, the first vibrator controller 22A randomly determines a duration in which vibration of the first vibrator 21A is turned off. The first vibrator controller 22A turns vibration of the first vibrator 21A off for the determined duration (Step S14). Next, the first vibrator controller 22A confirms a certain passage of time or ignition of a termination event from the user, the system, or the application. Conditions for termination are met by any one of those events or any combination of those events (Step S15). If the conditions for termination are not met, the first vibrator controller 22A repeats the steps from Step S11. Here, the ignition of the termination event from the user refers to a user's explicit operation such as a user's button operation. For example, the ignition of the termination event from the system or the application refers to a signal sent when a necessary and sufficient key is generated by the first key generator 13A. The determination of termination may be made with other conditions. The steps may be taken in the order of S13, S14, S11, S12, and S15.

FIG. 6 is a flow chart showing an example of operations of the first and second vibration quantizers 11A and 11B in this system. In Step S21, the first and second vibration quantizers 11A and 11B obtain a magnitude a_avg of an averaged acceleration measured in a steady state of the acceleration sensor. When time-series data of the acceleration are obtained from the first acceleration sensor 10A with an operation of the first vibrator controller 22A, the first vibration quantizer 11A of Device A divides the time-series data into short intervals (windows) having a size of w_onoff (Step S22). Then the first vibration quantizer 11A obtains a magnitude a_w of an averaged acceleration in each of the windows (Step S24) and examines whether a difference between a_w and a_avg is equal to or greater than a predetermined threshold k (Step S25). If the difference is equal to or greater than k, then the window in question is quantized into "1" (Step S26). If the difference is smaller than k, then the first vibration quantizer 11A quantizes the window in question into "0" (Step S27).

The first vibration quantizer 11A repeats this step for all of the windows (Step S28). In Device B, the second vibration quantizer 11B also performs the same operation based upon time-series data of the acceleration obtained from the second acceleration sensor 10B.

FIG. 9 is a flow chart showing an example of operations of the first and second feature vector generators 12A and 12B in this system. In Step S31, the first and second feature vector generators 12A and 12B search pulselike quantized values. Specifically, the first and second feature vector generators 12A and 12B search a window having a different quantized value in comparison with quantized values of its preceding and following window. In Step S32, the first and second feature vector generators 12A and 12B reverse the quantized value of the window. This process is repeated for all of windows having pulselike quantized values (Step S33). Subsequently, the first and second feature vector generators 12A and 12B determine an interval in which the same quantized values continue (continuation interval) (Step S34) and generate a feature vector based upon the number of windows having continuous values of "1" or "0" and the quantized value (Step S35). Furthermore, the first and second feature vector generators 12A and 12B provide quantized values of rising and falling time windows of the continuation interval, specifically the first window of the continuation interval and a window next to the last window of the continuation interval, with both candidates of "1" and "0" (Step S36). Thus, the first and second feature vector generators 12A and 12B calculate vectors (candidate vectors) as candidates for each of the feature vectors (Step S37).

FIG. 10 is a flow chart showing an example of operations of the first and second key generators 13A and 13B in this system. In Step S41, the first and second key generators 13A and 13B select a feature vector to be looked into. Feature vectors may be selected from older ones in chronological order. Nevertheless, the order of selection may be determined in accordance with other rules. Such rules should be agreed as a precondition by the correspondence device. In Step S42, the first and second key generators 13A and 13B perform one-way hash individually on the feature vector and its candidate vectors and make an exchange with the correspondence device. In Step S43, the first and second key generators 13A and 13B set any one of matched vectors as a key piece. This operation is repeated until all of the feature vectors are processed (Step S44). If a ratio of the number of windows for which key pieces have been obtained to the total number of windows is not less than a predetermined threshold, the first and second key generators 13A and 13B concatenate all of the obtained key pieces and set the concatenated key pieces as a common key (Step S45).

As described above, according to this example, for example, the length of intervals of turning vibration on and turning vibration off is randomly varied in a dynamic manner by a PWM (Pulse Width Modulation) control of a vibrator provided in a cellular phone. Two devices that are brought into contact with each other to collect this variation of intervals with an acceleration sensor can share a common key used for authentication. At that time, the vibration generated by the vibrator is so fine that possible errors can be absorbed. Therefore, an authentication key having a practical key length can be shared with the two devices.

While the present invention has been particularly shown and described with reference to exemplary embodiments (and examples) thereof, the present invention is not limited to the aforementioned embodiments (and examples). It will be understood by those of ordinary skill in the art that various changes in form and details may be made therein without departing from the spirit and scope of the present invention as defined by the claims.

The present application is based upon and claims the benefit of priority from Japanese Patent Application No. 2010-293094, filed on Dec. 28, 2010, the disclosure of which is incorporated herein in its entirety by reference.

The invention claimed is:

1. A key generation apparatus comprising:
   an acceleration sensor configured to detect an acceleration of the apparatus that is produced in accordance with vibration generated by a vibrator when the apparatus and another apparatus are brought into contact with the vibrator without aggregately holding and shaking the apparatus and the other apparatus;
   a transmitter configured to transmit a first feature value based upon the detection result of the acceleration sensor to the other apparatus;
   a receiver configured to receive a second feature value based upon an acceleration generated in the other apparatus from the other apparatus; and
   a key generator configured to compare the second feature value received by the receiver with the first feature value to generate a key based upon the comparison result.

2. The key generation apparatus as recited in claim 1, wherein the vibrator continuously repeats a plurality of times an on-interval in which vibration is generated and an off-interval in which no vibration is generated, and the acceleration sensor detects a plurality of on-intervals,
   the transmitter is configured to transmit, to the other apparatus, a plurality of first feature values based upon the detection result of each of the plurality of the on-intervals,
   the receiver is configured to receive, from the other apparatus, a plurality of second feature values based upon the detection result of each of the plurality of the on-intervals, and
   the key generator is configured to generate one key based upon a plurality of comparison results obtained by comparing one of the plurality of first feature values with one of the plurality of second feature values that corresponds to the one of the plurality of first feature values.

3. The key generation apparatus as recited in claim 2, wherein the key generator is configured to generate one key by comparing one of the plurality of first feature values with one of the plurality of second feature values that corresponds to the one of the plurality of first feature values, generating one key piece based upon a matched set of first and second feature values, and concatenating a plurality of key pieces in chronological order in the on-interval corresponding to the first and second feature values.

4. The key generation apparatus as recited in claim 1, comprising the vibrator.

5. The key generation apparatus as recited in claim 1, further comprising:
   a vibrator controller controlling the vibrator to generate and stop vibration in accordance with intervals having a randomly determined length in which vibration is generated and stopped;
   a quantizer dividing a detection result of vibration for a period including the interval by the acceleration sensor into time windows each having a predetermined time length to quantize each of the time windows; and
   a feature value generator generating the first feature value based upon the detection result quantized by the quantizer.

6. The key generation apparatus as recited in claim 5, wherein the vibrator controller generates or stops vibration of the vibrator based upon the number of the intervals that is determined by the key length of a key to be generated.

7. The key generation apparatus as recited in claim 5 wherein:
the quantizer quantizes existence of the vibration, and
the feature value generator generates the first feature value based upon the number of time windows in a continuation interval including time windows continuously holding the same quantized value.

8. The key generation apparatus as recited in claim 7, wherein, when only a quantized value of the second time window among quantized values of three successive time windows differs from quantized values of the other time windows, the feature value generator performs an operation of changing the quantized value of the second time window into the quantized values of the other time windows, before time windows of the continuation interval are counted.

9. The key generation apparatus as recited in claim 7 wherein:
the feature value generator includes:
a value changer configured to change a quantized value of either one of a beginning time window, which is the first time window of the continuation interval, and an ending time window, which is a time window right after the last time window of the continuation interval, and
a candidate generator configured to generate a first candidate value based upon the number of time windows in a continuation interval continuously holding the same quantized value when the changed quantized value is applied to the time window in question,
the transmitter is configured to transmit the first candidate value in addition to the first feature value,
the receiver is configured to receive a second candidate value generated in the same manner as the first candidate value in addition to the second feature value, and
the key generator is configured to compare one of the second feature value and the second candidate value received by the reception means with one of the first feature value and the first candidate value to generate a key based upon the comparison result.

10. The key generation apparatus as recited in claim 1, further comprising a hasher configured to output a hash value from an input value, wherein:
the transmitter is configured to transmit, to the other apparatus, a hash value of the first feature value that is obtained by the hasher or hash values of the first feature value and the first candidate value that are obtained by the hasher as a first hash value, instead of the first feature value or instead of the first feature value and the first candidate value,
the receiver is configured to receive a hash value of the second feature value or hash values of the second feature value and the second candidate value as a second hash value, instead of the second feature value or instead of the second feature value and the second candidate value, and
the key generator is configured to compare the second hash value received by the receiver with the first hash value to generate a key based upon the comparison result.

11. A key generation system comprising a plurality of key generation apparatuses as recited in claim 1 and at least one vibrator.

12. A non-transitory computer-readable recording medium for storing a program executable in an apparatus comprising an acceleration sensor, a data communication part, and a processor, the program executing a procedure with the processor, the procedure comprising:
a detection step of detecting, with the acceleration sensor, an acceleration of the apparatus that is produced in accordance with vibration generated by a vibrator when the apparatus and another apparatus are brought into contact with the without aggregately holding and shaking the apparatus and the other apparatus;
a transmission step of transmitting, with the data communication part, a first feature value based upon the detection result of the acceleration sensor to the other apparatus;
a reception step of receiving, with the data communication part, a second feature value based upon an acceleration generated in the other apparatus in accordance with vibration generated by the vibrator from the other apparatus; and
a key generation step of comparing the second feature value received by the reception step with the first feature value to generate a key based upon the comparison result.

13. The non-transitory computer-readable recording medium as recited in claim 12, wherein:
in the detection step, an on-interval in which vibration is generated and an off-interval in which no vibration is generated are continuously repeated a plurality of times, and a plurality of on-intervals are detected by the acceleration sensor,
in the transmission step, a plurality of first feature values based upon the detection result of each of the plurality of the on-intervals are transmitted to the other apparatus,
in the reception step, a plurality of second feature values based upon the detection result of each of the plurality of the on-intervals are received from the other apparatus, and
in the key generation step, one key is generated based upon a plurality of comparison results obtained by comparing one of the plurality of first feature values with one of the plurality of second feature values that corresponds to the one of the plurality of first feature values.

14. The non-transitory computer-readable recording medium as recited in claim 13, wherein, in the key generation step, one key is generated by comparing one of the plurality of first feature values with one of the plurality of second feature values that corresponds to the one of the plurality of first feature values, generating one key piece based upon a matched set of first and second feature values, and concatenating a plurality of key pieces in chronological order in the on-interval corresponding to the first and second feature values.

15. The non-transitory computer-readable recording medium as recited in claim 12, storing a program executable in the apparatus further comprising a vibrator, the program executing a procedure for controlling an operation of the vibrator with the processor.

16. The non-transitory computer-readable recording medium as recited in claim 12, wherein the program executes a procedure with the processor, the procedure comprising:
a control step of generating and stopping vibration in accordance with intervals having a randomly determined length in which vibration is generated and stopped;
a quantization step of dividing a detection result of vibration for a period including the interval by the acceleration sensor into time windows each having a predetermined time length to quantize each of the time windows; and a feature value generation step of generating the first feature value based upon the detection result quantized in the quantization step.

17. The non-transitory computer-readable recording medium as recited in claim 16, wherein, in the control step, vibration of the vibrator is generated or stopped based upon the number of the intervals that is determined by the key length of a key to be generated.

18. The non-transitory computer-readable recording medium as recited in claim 16, wherein:

in the quantization step, existence of the vibration is quantized, and in the feature value generation step, the first feature value is generated based upon the number of time windows in a continuation interval including time windows continuously holding the same quantized value.

19. The non-transitory computer-readable recording medium as recited in claim 18, wherein, in the feature value generation step, when only a quantized value of the second time window among quantized values of three successive time windows differs from quantized values of the other time windows, an operation of changing the quantized value of the second time window into the quantized values of the other time windows is performed before time windows of the continuation interval are counted.

20. The non-transitory computer-readable recording medium as recited in claim 18, wherein:

the feature value generation step includes:
a step of changing a quantized value of either one of a beginning time window, which is the first time window of the continuation interval, and an ending time window, which is a time window right after the last time window of the continuation interval, and a step of generating a first candidate value based upon the number of time windows in a continuation interval continuously holding the same quantized value when the changed quantized value is applied to the time window in question, in the transmission step, the first candidate value is transmitted in addition to the first feature value, in the reception step, a second candidate value generated in the same manner as the first candidate value is received in addition to the second feature value, and in the key generation step, one of the second feature value and the second candidate value received by the reception means is compared with one of the first feature value and the first candidate value, and a key is generated based upon the comparison result.

21. The non-transitory computer-readable recording medium as recited in claim 12, wherein:

the program further includes a hash step of outputting a hash value from an input value, in the transmission step, a hash value of the first feature value that is obtained in the hash step or hash values of the first feature value and the first candidate value that are obtained in the hash step are transmitted as a first hash value to the other apparatus instead of the first feature value or instead of the first feature value and the first candidate value, in the reception step, a hash value of the second feature value or hash values of the second feature value and the second candidate value are received as a second hash value, instead of the second feature value or instead of the second feature value and the second candidate value, and in the key generation step, the second hash value received in the reception step is compared with the first hash value, and a key is generated based upon the comparison result.

22. A method of generating a key, comprising:

generating vibration with a vibrator in a state in which a first device and a second device are brought into contact with the vibrator without aggregately holding and shaking the first device and the second device and detecting the vibration with a first acceleration sensor provided in the first device and a second acceleration sensor provided in the second device;

transmitting, from the first device, a first feature value based upon the detection result of the first acceleration sensor to the second device;

receiving, in the first device, a second feature value based upon the detection result of the second acceleration sensor from the second device; and comparing, in the first device, the received second feature value with the first feature value to generate a key based upon the comparison result.

23. The method as recited in claim 22, wherein:

in the detecting, an on-interval in which vibration is generated and an off-interval in which no vibration is generated are continuously repeated a plurality of times, and a plurality of on-intervals are detected by first and second acceleration sensors, in the transmitting, a plurality of first feature values based upon the detection result of each of the plurality of the on-intervals are transmitted to the second device, in the receiving, a plurality of second feature values based upon the detection result of each of the plurality of the on-intervals are received from the second device, and in the key generating, one key is generated based upon a plurality of comparison results obtained by comparing one of the plurality of first feature values with one of the plurality of second feature values that corresponds to the one of the plurality of first feature values.

24. The method as recited in claim 23, wherein, in the key generating, one key is generated by comparing one of the plurality of first feature values with one of the plurality of second feature values that corresponds to the one of the plurality of first feature values, generating one key piece based upon a matched set of first and second feature values, and concatenating a plurality of key pieces in chronological order in the on-interval corresponding to the first and second feature values.

25. The method as recited in claim 22, comprising:

controlling the vibrator to generate and stop vibration in accordance with intervals having a randomly determined length in which vibration is generated and stopped;

dividing a detection result of vibration for a period including the interval by the acceleration sensor into time windows each having a predetermined time length to quantize each of the time windows; and generating the first feature value based upon the detection result quantized in the quantizing.

26. The method as recited in claim 25, wherein, in the controlling, vibration of the vibrator is generated or stopped based upon the number of the intervals that is determined by the key length of a key to be generated.

27. The method as recited in claim 25, wherein:
in the quantizing, existence of the vibration is quantized, and
in the feature value generating, the first feature value is generated based upon the number of time windows in a continuation interval including time windows continuously holding the same quantized value.

28. The method as recited in claim 27, wherein, in the feature value generating, when only a quantized value of the second time window among quantized values of three successive time windows differs from quantized values of the other time windows, an operation of changing the quantized value of the second time window into the quantized values of the other time windows is performed before time windows of the continuation interval are counted.

29. The method as recited in claim 27, wherein:
the feature value generating includes:
changing a quantized value of either one of a beginning time window, which is the first time window of the continuation interval, and an ending time window, which is a time window right after the last time window of the continuation interval, and
generating a first candidate value based upon the number of time windows in a continuation interval continuously holding the same quantized value when the changed quantized value is applied to the time window in question,
in the transmitting, the first candidate value is transmitted in addition to the first feature value,
in the receiving, a second candidate value generated in the same manner as the first candidate value is received in addition to the second feature value, and
in the key generating, one of the second feature value and the second candidate value received by the receiving is compared with one of the first feature value and the first candidate value, and a key is generated based upon the comparison result.

30. The method as recited in claim 22, further comprising outputting a hash value from an input value, wherein:
in the transmitting, a hash value of the first feature value that is obtained in outputting or hash values of the first feature value and the first candidate value that are obtained in the outputting are transmitted as a first hash value to the other apparatus instead of the first feature value or instead of the first feature value and the first candidate value,
in the receiving, a hash value of the second feature value or hash values of the second feature value and the second candidate value are received as a second hash value, instead of the second feature value or instead of the second feature value and the second candidate value, and
in the key generating, the second hash value received in the reception step is compared with the first hash value, and a key is generated based upon the comparison result.

* * * * *